(12) United States Patent
Baker et al.

(10) Patent No.: US 9,693,346 B2
(45) Date of Patent: Jun. 27, 2017

(54) METHOD FOR COMMUNICATING IN A MOBILE NETWORK

(71) Applicant: KONINKLIJKE PHILIPS N.V., Eindhoven (NL)

(72) Inventors: Matthew P. J. Baker, Canterbury (GB); Timothy James Moulsley, Caterham (GB); Paul Bucknell, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 119 days.

(21) Appl. No.: 14/507,342

(22) Filed: Oct. 6, 2014

(65) Prior Publication Data
US 2015/0023300 A1    Jan. 22, 2015

Related U.S. Application Data

(63) Continuation of application No. 12/933,913, filed as application No. PCT/IB2009/051261 on Mar. 26, 2009, now Pat. No. 9,173,212.

(30) Foreign Application Priority Data

Mar. 27, 2008  (EP) ..................... 08305074

(51) Int. Cl.
H04W 72/04 (2009.01)
H04W 88/08 (2009.01)
(Continued)

(52) U.S. Cl.
CPC ......... H04W 72/042 (2013.01); H04L 5/0053 (2013.01); H04L 5/0094 (2013.01);
(Continued)

(58) Field of Classification Search
CPC .. H04W 72/042; H04W 88/08; H04L 5/0053; H04L 5/0094
(Continued)

(56) References Cited

U.S. PATENT DOCUMENTS 6,785,548 B2   8/2004   Moulsley et al.
6,958,989 B1  10/2005   Dick et al.
(Continued)

FOREIGN PATENT DOCUMENTS

EP    1901496 A1    3/2008
EP    1944896 A1    7/2008
(Continued)

OTHER PUBLICATIONS

Ericsson, "Summary of Email Discussion on DL Control Signaling", TSG-RANA AWG1 #52, R1-080869, Sosrento, Italy, Feb. 1-15, 2008, pp. 8-15.
(Continued)

*Primary Examiner* — Ronald B Abelson

(57) ABSTRACT

A method for communicating between a primary station and at least one secondary station, comprising: configuring the secondary station to search at least one of a plurality of search spaces having a first structure, the first structure consisting of at least a first number of resource sets having a first size, where at least one resource set is for transmitting a message to the secondary station, and changing the search space structure to a second structure different from the first structure in response to a signalling message.

32 Claims, 2 Drawing Sheets

(51) Int. Cl.
*H04L 5/00* (2006.01)
*H04B 7/06* (2006.01)

(52) U.S. Cl.
CPC ............. *H04W 88/08* (2013.01); *H04B 7/063* (2013.01); *H04B 7/0617* (2013.01)

(58) Field of Classification Search
USPC .................................................. 370/328, 329
See application file for complete search history.

(56) References Cited

U.S. PATENT DOCUMENTS

| | | | |
|---|---|---|---|
| 8,638,734 B2 | 1/2014 | Baker et al. | |
| 2001/0026547 A1 | 10/2001 | Moulsley et al. | |
| 2004/0043784 A1 | 3/2004 | Czaja et al. | |
| 2006/0067416 A1 | 3/2006 | Tirkkonen et al. | |
| 2007/0038615 A1 | 2/2007 | Vadon et al. | |
| 2008/0065603 A1 | 3/2008 | Carlson et al. | |
| 2008/0225786 A1* | 9/2008 | Han | H04W 72/14 370/329 |
| 2008/0273479 A1* | 11/2008 | Kwak | H04W 72/14 370/311 |
| 2009/0074090 A1* | 3/2009 | Xu | H04L 27/2647 375/260 |
| 2009/0088148 A1* | 4/2009 | Chung | H04L 1/0029 455/423 |
| 2009/0088175 A1 | 4/2009 | Pelletier et al. | |
| 2009/0154607 A1* | 6/2009 | Lindoff | H04L 1/0038 375/341 |
| 2009/0209247 A1* | 8/2009 | Lee | H04L 5/0007 455/422.1 |
| 2009/0310453 A1 | 12/2009 | Bakx et al. | |
| 2010/0061345 A1 | 3/2010 | Wengerter et al. | |
| 2012/0143757 A1 | 6/2012 | Belamant | |

FOREIGN PATENT DOCUMENTS

| | | |
|---|---|---|
| EP | 1625766 B1 | 10/2008 |
| EP | 1969738 B1 | 3/2014 |
| JP | 2009545091 A | 12/2009 |
| JP | 2010510566 A | 4/2010 |
| JP | 2010516129 A | 5/2010 |
| JP | 2010529757 A | 8/2010 |
| WO | 0173970 A2 | 10/2001 |
| WO | 2007083230 A2 | 7/2007 |
| WO | 2008023943 A1 | 2/2008 |
| WO | 2008157692 A3 | 12/2008 |
| WO | 2009042845 A2 | 4/2009 |

OTHER PUBLICATIONS

Motorola, "Search Space Definition for L1/L2 Control Channels", 3GPP TSG RAN1 #51, R1-073373, Athens Greece, Aug. 20, 2007.
ZTE, "CCE Allocation Scheme in PDCCH for Efficient Blind Detectin", 3GPP TSG-RAN WG1 #51, R1-074559, Jeju Korea, 2007, 3 Page Document.

* cited by examiner

METHOD FOR COMMUNICATING IN A MOBILE NETWORK

This application claims the benefit or priority of and describes the relationships between the following applications: wherein this application is a continuation of U.S. patent application Ser. No. 12/933,913, filed Sep. 22, 2010, which is the National Stage of International Application No. PCT IB2009/051261 filed Mar. 26, 2009, which claims the priority of foreign applications EPO 08305074.0 filed Mar. 27, 2008, all of which are incorporated herein in whole by reference.

The present invention relates to a method for communicating in a network. More specifically, the present invention relates to communication between a primary station and a secondary station, in a telecommunication network, like a cellular telecommunication network (e.g. UMTS, GSM).

In UMTS (Universal Mobile Telecommunication System) LTE (Long Term Evolution) the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8.

The UE does not know in advance the location in CCE space of messages intended for it. In principle a UE could attempt to blindly decode all the possible PDCCHs with different starting positions in the CCE space and thus receive any messages intended for that UE. However, if the CCE space is large the processing complexity is prohibitive. Therefore a more limited search is configured which consists of a number of search spaces.

A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station thus can have up to four search spaces. For example, the search space of a UE for aggregation level 1 (referred to as 1-CCE) could consist of the CCEs indexed 3, 4, 5, 6, 7, 8, while its search space for aggregation level 8 could consist of the two resource sets of aggregated CCEs consisting of the CCEs indexed by 1, 2, . . . 8 and 9, 10, . . . , 16, respectively. In this example, the UE thus performs six blind decodings for 1-CCEs and two blind decodings for 8-CCEs.

The UMTS LTE specification currently requires the UE to perform the following:
- 6 decoding attempts of 1-CCE aggregation
- 6 decoding attempts of 2-CCE aggregation
- 2 decoding attempts of 4-CCE aggregation
- 2 decoding attempts of 8-CCE aggregation The larger aggregations are intended to be used for large messages, and/or small messages when a lower code rate is required, for example under bad channel conditions. However, restricting the search spaces to reduce processing complexity limits the availability of suitable aggregations for different conditions as conditions vary.

It is an object of the invention to propose a method of communication which alleviates the above mentioned problem.

It is another object of the invention to provide a method enabling the search space to be adapted to the situation, without causing more signaling or overhead.

To this end, in accordance with the invention, a method is proposed for communicating between a primary station and at least one secondary station, comprising (a) configuring each secondary station to search at least one of a plurality of search spaces having a first structure, the first structure consisting of at least a first number of resource sets having a first size, where at least one resource set might be used to transmit a message to the considered secondary station, (b) changing the search space structure to a second structure different from the first structure.

As a consequence, the structure of the search space may be changed in accordance with a particular situation. For instance in case of a change in the transmission characteristics, like the channel conditions, it is possible to change the search space. The channel conditions may change because of new interference sources or because of mobility of a secondary station approaching the cell edge.

The present invention also relates to a primary station comprising means for communicating with at least one secondary station, comprising configuring means for configuring each secondary station to search at least one of a plurality of search spaces having a first structure, the first structure consisting of at least a first number of resource sets having a first size, where at least one resource set might be used to transmit a message to the considered secondary station, and wherein the configuring means are arranged for changing the search space structure to a second structure different from the first structure.

In accordance with still another aspect of the invention, a secondary station is proposed, the secondary station comprising means for communicating with a primary station, the secondary station comprising control means for searching at least one of a plurality of search spaces having a first structure, the first structure consisting of at least a first number of resource sets having a first size, where at least one resource set might be used to transmit a message to the considered secondary station, wherein the control means are arranged for changing the search space structure to a second structure different from the first structure in response to a indication from the primary station of a change in the search space structure.

These and other aspects of the invention will be apparent from and will be elucidated with reference to the embodiments described hereinafter.

The present invention will now be described in more detail, by way of example, with reference to the accompanying drawing, wherein.

The present invention relates to a method for communicating in a network, like a cellular network. For instance, the network may be a UMTS network as depicted on FIG. 1.

Figure 1:
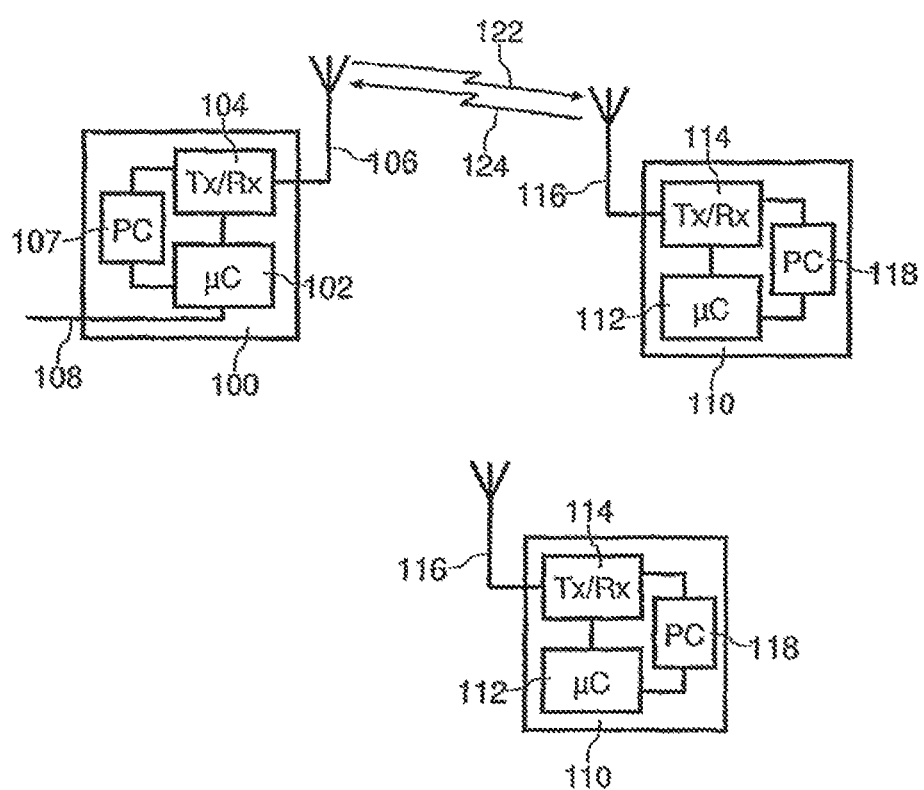
FIG. 1 is a block diagram of a system in accordance with the invention comprising a primary station and at least a secondary station.

Referring to FIG. 1, a radio communication system in accordance with the invention comprises a primary station (BS) 100 and a plurality of secondary stations (MS) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN (Public Switched Telephone Network) or other suitable network. Each MS 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on a downlink channel, while communication from secondary station 110 to primary station 100 takes place on an uplink channel.

One of the downlink control channels received by the secondary stations is the PDDCH, where each secondary station has to blindly decode a plurality of sets of CCEs to find which set was allocated to it as set out in the preamble of the description.

In accordance with a first embodiment of the invention, it is assumed that 48 CCEs are available. This corresponds to the illustrative exemplary first embodiment of the invention. Various sets of 48 search spaces for the 1-CCEs have been considered; to each user to which a 1-CCE is to be sent, one of these 48 search spaces is assigned at random (the choice corresponds to the outcome of a hash function of that UE that we model as being uniform over the numbers 1, 2, . . . , 48). Each search space consists of six CCEs in this example. The following sets of search spaces have been considered:

S_1: all search spaces contiguous—i.e. of the form $\{i, i+1, i+2, i+3, i+4, i+5\}$ with $0 \leq i \leq 47$ where i is the CCE index, and all elements modulo 48.

S_5: all search spaces of the form $\{i, i+5, i+10, i+15, i+20, i+25\}$ with $0 \leq i \leq 47$, and all elements modulo 48.

S_7: all search spaces of the form $\{i, i+7, i+14, i+21, i+28, i+35\}$ with $0 \leq i \leq 47$, and all elements modulo 48.

S_d: all search spaces of the form $\{i, i+1, i+3, i+7, i+12, i+22\}$ with $0 \leq i \leq 47$, and all elements modulo 48. S_d is designed so that all search spaces overlap in just 1 CCE.

So, for example, the search space of S_5 corresponding to i=25 consists of the CCEs indexed by 25, 30, 35, 40, 45, 2 (as 50 modulo 48 equals 2).

Figure 2:
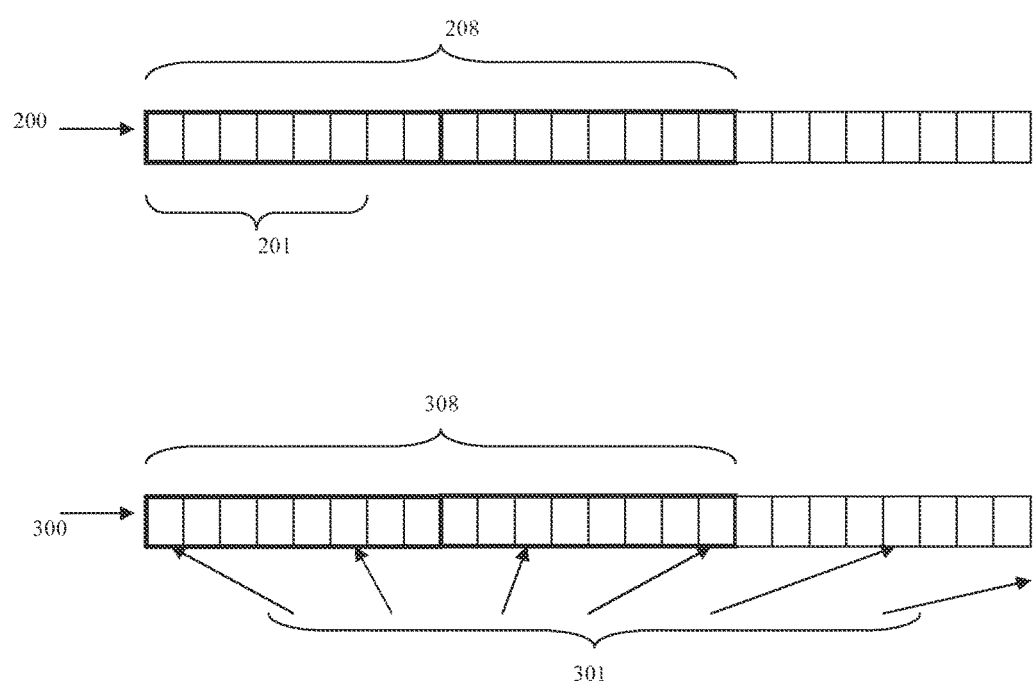
FIG. 2 is a time chart representing the allocated search spaces in accordance an embodiment of the invention.

FIG. 2 illustrates the use of a pattern enabling the number of resource elements in common to be minimized, in accordance with the first embodiment, compared with the prior art. On FIG. 2, a set of available resources 200 are depicted.

In a conventional system, if only sets of 1-CCEs and 8-CCEs are considered, the search space for one secondary station or UE for 8-CCE messages (2 positions 208 are constructed from contiguous groups of CCEs) is depicted on FIG. 2. The positions 201 of 1-CCE messages (6 contiguous positions) are such that it is likely that all possible positions are blocked if another UE is receiving an 8-CCE message.

In accordance with the first embodiment of the invention, the set of available resources 300 comprises search space for one UE for 8-CCE messages 308, as on FIG. 2 where 2 positions are constructed from contiguous groups of CCEs. Regarding the search space for a UE for 1-CCE messages, 6 non-contiguous positions 301 are represented. These positions are non-contiguous, so that they reduce overlap with higher aggregation-level search space and therefore increase likelihood that a position can be found to send a small message.

A fixed set of search spaces can be a good compromise for typical situations. However, in some cases, for example where a secondary station or a UE near the cell border experiences bad channel conditions over an extended period, it would be advantageous to modify the search spaces to allow more blind decodings for 4 and 8-CCEs, like in a first variant of the first embodiment of the invention, and fewer for 1-CCE.

For example:
2 decoding attempts of 1-CCE aggregation
2 decoding attempts of 2-CCE aggregation
6 decoding attempts of 4-CCE aggregation
6 decoding attempts of 8-CCE aggregation This modification could be carried out using explicit RRC signaling. However, other solutions are of interest, for example with lower signaling overhead.

One aspect of the invention is to re-configure the search spaces implicitly, based on other changes in the UE mode or configuration. These changes could be indicated by RRC signaling or otherwise. As an example, a change of the transmission rate or the selection of a particular modulation scheme induces the selection of another search space in accordance with this variant of the invention. Indeed, in case the transmission rate is lowered, it implies that the transmission conditions have been deteriorated. Thus, this variant avoids transmitting an explicit message for changing the search space, the secondary station carries out the change from the modification of the transmission characteristic. For each applicable UE mode there is a default set of search spaces.

We assume, as an example, that the default search spaces are configured as follows:
6 decoding attempts of 1-CCE aggregation
6 decoding attempts of 2-CCE aggregation
2 decoding attempts of 4-CCE aggregation
2 decoding attempts of 8-CCE aggregation In one embodiment the invention is applied in LTE to modify the PDCCH search spaces. If the UE reports channel quality less than a certain threshold, then the search spaces could be modified to:
2 decoding attempts of 1-CCE aggregation
2 decoding attempts of 2-CCE aggregation
6 decoding attempts of 4-CCE aggregation
6 decoding attempts of 8-CCE aggregation In a further embodiment the invention is applied in LTE to modify the PDCCH search spaces when the UE is configured to use UE-specific reference symbols. The configuration of UE-specific reference symbols is likely to imply that UE-specific beamforming is being used, and UE-specific beamforming is most likely to be applied at the cell border with poor SINR. Also, if beamforming is applied to data, this would make it desirable that the PDCCH is made more robust, in order to match the extended coverage of the data transmission. As an example the following could apply when beamforming is used:
2 decoding attempts of 1-CCE aggregation
2 decoding attempts of 2-CCE aggregation
6 decoding attempts of 4-CCE aggregation
6 decoding attempts of 8-CCE aggregation A refinement would be to limit the set of different message formats which are blindly decoded for each aggregation size, and apply different limits depending on the UE configuration. For example if MIMO is not supported in beamforming mode (or when UE-specific reference symbols are configured), then it would not be necessary to blindly decode message formats designed for MIMO operation.

A further embodiment could adapt the search space depending on UE capabilities—for example if a UE does not support MIMO (e.g. due to a limitation in the number of physical antennas), message formats designed for MIMO operation would be implicitly excluded from the search. The same would be true if a UE supporting MIMO was configured not to operate in MIMO mode (e.g. by network signaling).

As an example the following could apply for a UE which did not support MIMO:
8 decoding attempts of 1-CCE aggregation
6 decoding attempts of 2-CCE aggregation
1 decoding attempts of 4-CCE aggregation
1 decoding attempts of 8-CCE aggregation In a further embodiment the UE may be configured to use semi-persistent scheduling.

In this case the same resource allocation is understood to apply periodically. RRC signaling indicates the period. Some PDCCH messages may configure the resource. Such messages may be identified by one or more of:
- a different ID (CRNTI) from that used for normal messages.
- Different scrambling from that used for normal messages
- Different HARQ processes from those indicated by normal messages
- Different Incremental Redundancy Versions from those indicated by normal messages
- Different Modulation and Coding Scheme from those indicated by normal messages
- An extra bit In that case the following search spaces could be used for each of the two CRNTIs:
- 3 decoding attempts of 1-CCE aggregation
- 3 decoding attempts of 2-CCE aggregation
- 1 decoding attempts of 4-CCE aggregation
- 1 decoding attempts of 8-CCE aggregation As a refinement the modified search space may only be applicable in certain subframes, for example, the subframes where a persistent resource allocation is applicable.

As a further refinement the search space could revert to the default one following a cell change (handover), or a further change of the transmission characteristic.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or an preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for communicating between a primary station and at least one secondary station, the method comprising:
configuring the secondary station to search at least one of a plurality of search spaces having a first structure, the first structure consisting of at least a first number of resource sets having a first size, where at least one of the resource sets is for transmitting a message from the primary station to the secondary station,
changing the search space structure for the secondary station to a second structure different from the first structure,
wherein the structure is changed from the first structure to the second structure in response to a message from the primary station indicating a different transmission characteristic.

2. The method of claim 1, comprising changing the search space structure based on a message from the secondary station to the primary station regarding the transmission quality of the channel.

3. The method of claim 1, comprising transmitting a signaling message from the secondary station to the primary station regarding a transmission mode.

4. The method of claim 3, wherein the transmission mode is a beamforming mode.

5. The method of claim 4, wherein the signaling message includes an indication of a specific beamforming parameter.

6. The method of claim 5, wherein the beamforming parameter comprises an indication of the use of a type of pilot signal.

7. The method of claim 1, wherein the message includes an allocation of a resource.

8. The method of claim 7, wherein the allocation of resource is a semi persistent scheduling resource.

9. The method of claim 1, wherein the second structure is selected depending on the secondary station capabilities.

10. The method of claim 1, wherein the first structure consists of at least a first number of resource sets having a first size, the second structure consists of at least a second number of resource sets having a first size, where the second number is different to the first number.

11. The method of claim 1, wherein the first structure consists of at least a first number of resource sets having a first size and a third number of resource units of a second size, and the second structure consists of at least a second number of resource sets having a first size, and a fourth number of resource sets of a second size, where the second number is smaller than the first number and the fourth number is larger than the third number.

12. The method of claim 1, wherein the second structure has a different number of resource sets than the first structure.

13. A secondary station comprising:
a transceiver configured to communicate with a primary station,
a control circuit configured to search for at least one of a plurality of search spaces having a first structure, the first structure consisting of at least a first number of resource sets having a first size, where at least one resource set is for the transceiver receiving a message from the primary station, and
wherein the control circuit is configured to change the search space structure for the secondary station to a second structure different from the first structure in response to a message from the primary station indicating a different transmission characteristic.

14. The secondary station of claim 13, wherein the change in search space structure is based on an indication in a signaling message received by the secondary station, and wherein the signaling message indicates a change in the communication condition of the network.

15. The secondary station of claim 14, wherein the indication in the signaling message received by the station indicates a change in transmission mode.

16. The secondary station of claim 15, wherein the change in transmission mode comprises a change in a beamforming mode.

17. The secondary station of claim 13, wherein the control circuit is configured to transmit to the primary station, through the transceiver and an uplink channel, a message comprising an indication of a capability of the secondary station.

18. The secondary station of claim 13, wherein the second search space structure comprises at least a second number of resource sets having the first size; and wherein the second number of resource sets is different from the first number of resource sets.

19. The secondary station of 13, wherein the message transmitted to the secondary station indicates an allocation of resource.

20. The secondary station of 19, wherein the allocation of resource is an allocation for a dynamic scheduling resource or a semi-persistent scheduling resource.

21. The secondary station of claim 13, wherein messages are configured to be received by the secondary station using resources within a resource set, and wherein a resource set comprises aggregated CCEs, a search space is a resource set of aggregated CCEs, each CCE is identified by an index, and a search space structure is a plurality of search spaces comprising a number of indexed resource sets of aggregated CCEs.

22. The primary station of claim 13, wherein the second structure has a different number of resource sets than the first structure.

23. A primary station comprising:
a transceiver for communicating with at least one secondary station,
a control circuit for configuring a secondary station to search at least one of a plurality of search spaces having a first structure, the first structure consisting of at least a first number of resource sets having a first size, where at least one resource set is for the transceiver transmitting a message to the secondary station, and
wherein the control circuit is configured to change the search space structure for the secondary station to a second structure different from the first structure,
wherein the structure is changed from a first structure to a second structure in response to a message from the primary station indicating a different transmission characteristic.

24. The primary station of claim 23, wherein the change in search space structure is based on an indication in a signaling message transmitted to the secondary station, and wherein the signaling message indicates a change in the communication condition of the network.

25. The primary station of claim 24, wherein the indication in the signaling message transmitted by the primary station indicates a change in transmission mode.

26. The primary station of claim 25, wherein the change in transmission mode comprises a change in a beamforming mode.

27. The primary station of claim 23, wherein the control circuit is configured to receive from the secondary station, through the transceiver and an uplink channel, a message comprising an indication of a capability of the secondary station, and the control circuit is configured to configure the secondary station by changing the search space structure to search based on the capability of the secondary station.

28. The primary station of claim 23, wherein the second search space structure comprises at least a second number of resource sets having the first size; and wherein the second number of resource sets is different from the first number of resource sets.

29. The primary station of claim 23, wherein the message transmitted to the secondary station indicates an allocation of resource.

30. The primary station of claim 29, wherein the allocation of resource is an allocation for a dynamic scheduling resource or a semi-persistent scheduling resource.

31. The primary station of claim 23, wherein messages are configured to be transmitted to the secondary station using resources within a resource set, and wherein a resource set comprises aggregated CCEs, a search space comprises a set of aggregated CCEs, and a search space structure is a plurality of search spaces comprising a number of indexed resource sets of aggregated CCEs.

32. The primary station of claim 23, wherein the second structure has a different number of resource sets than the first structure.

* * * * *